United States Patent Office 3,215,192
Patented Nov. 2, 1965

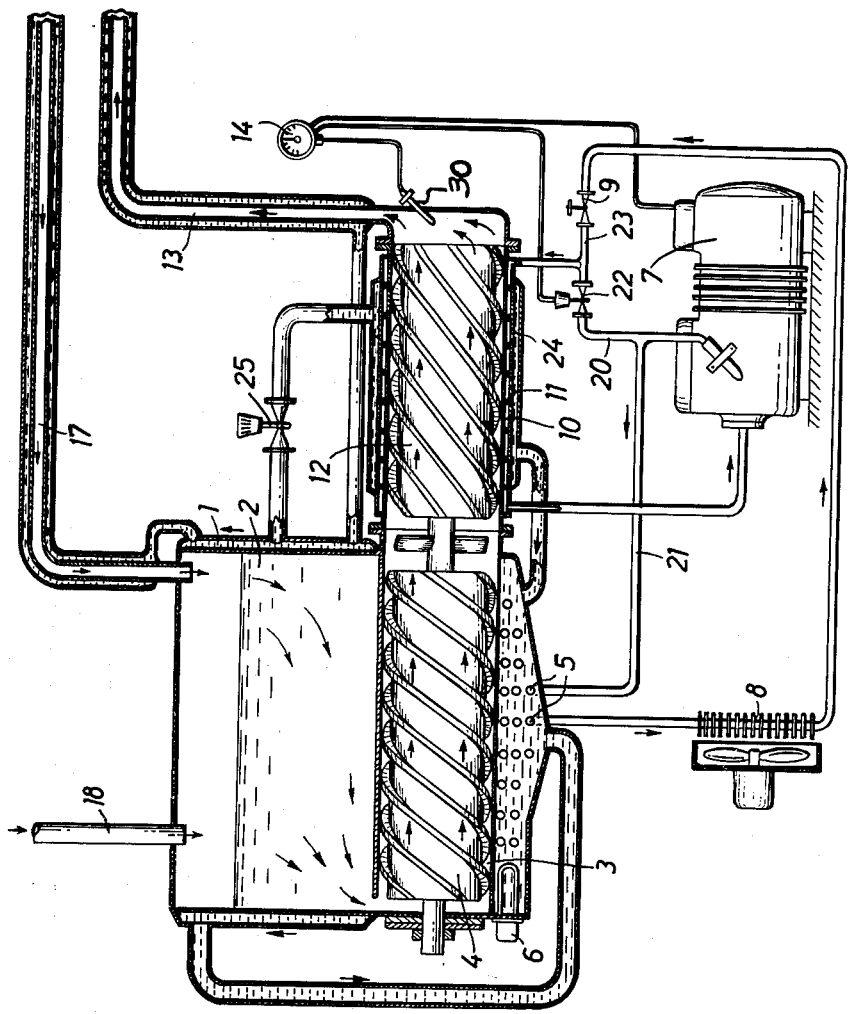

3,215,192
APPARATUS FOR MAINTAINING CONTROLLED TEMPERATURES IN CHOCOLATE CANDY MASSES
Robert Sollich, Auf der Breden 12, Bad Salzuflen, Germany
Filed Dec. 30, 1963, Ser. No. 334,209
5 Claims. (Cl. 165—17)

This is a continuation-in-part application of U.S. application Serial No. 311,879 filed in the U.S. Patent Office on September 26, 1963.

The present invention relates to the novel control arrangement for maintaining the predetermined temperature at the cooling cylinder which surrounds the conveyor screw at the forward end of the extrusion apparatus. One of the basic features of the apparatus disclosed in the parent application resides in the fact that the compressor is designed for an output which is about 5 to 10% larger than is required for the actual cooling of the chocolate candy mass before extrusion takes place. The control of the temperature at the cooling cylinder, more specifically the arrangement for preventing excessively low temperatures includes a temperature gauge connected to a probe located in contact with the chocolate mass at the outlet of the screw conveyor to sense the temperature of the mass at this point and to control the switch adapted to open or close an electric current line leading from the compressor to a heating coil embedded in the wall of the cooling cylinder. By means of the automatic heat supply provided by this heating wire the temperature variations in the chocolate mass are limited to a fraction of one degree. A similar effect in counteracting excessive cooling of the cylinder surrounding the forward end of the screw conveyor may also be obtained by enlarging or extending the water jacket which surrounds the conveyor cylinder at the inner end as well as the storage container for the chocolate mass disposed above the conveyor cylinder at this end. The water in this water jacket is heated by the condensation heat developed in liquefying the coolant in a condensation coil disposed in the water jacket below the rear conveyor cylinder. Additional heating means of a conventional type may be provided to control the temperature of the water in this jacket, particularly in order to heat the water in the heating jacket when the compressor is not operating.

It is therefore an object of this application to provide a water jacket around the cooling cylinder at the forward end of the conveyor screw which is connected through valve means to the water jacket which surrounds the rearward end of the screw conveyor and adapted to transfer heat to this cylinder.

It is an other object of this invention to provide means for controlling the temperature of the water in the water jacket surrounding the cooling cylinder whereby the heating coil of the parent application may be entirely eliminated.

The temperature at the cooling cylinder may be controlled according to the present invention by providing a connecting line or a by-pass line between the gas line leading from the compressor to the condensing coil in the water jacket surrounding the rearward end of the conveyor screw and between the liquid line of the compressor leading from the condensing coil to the evaporator portion of the compressor disposed around the cooling cylinder. A magnetically controlled valve is located in this by-pass line and is connected to the temperature gauge and is regulated through an electric current line in the same manner as the heating coil employed for the same purpose in the parent application as will be described more fully hereafter.

Additional features and advantages of the process and apparatus of this invention will become apparent from the following description in conjunction with the accompanying drawing which shows in the single figure a side elevation view of the temperature control apparatus of this invention associaed with a conventional screw conveyor device.

In reference to the drawing the water jacket 1 surrounds the storage container 2 for the chocolate candy mass. At the lower end of the storage container a heating cylinder 3 is provided which is also surrounded with water, and in which a conveyor screw 4 is mounted rotatably for the purpose of moving the chocolate candy mass through a narrow circular gap along the heated wall surfaces of the cylinder.

When the chocolate mass leaves the heating cylinder 3 it has a temperature of between 36 and 39° C. so that it is in a molten state and free of any crystal formations of cocoa butter. At its lowest point the water jacket 1 is enlarged in such a way that the condensation coil 5 for the coolant as well as a heating device 6 for controlling the temperature of the water in the jacket may be accommodated. The gas coolant coming from compressor 7 is liquefied in the condenser coil 5. The heat energy liberated during this liquefying process of the gas coolant is delivered to the water jacket 1. Of course it is not necessary that this heat be transferred to a water jacket, because it is conceivable that the condensation heat be delivered, for example, directly to the conveyor cylinder and the candy mass. The heating element 6 is provided in order to transfer heat to the water contained in jacket 1 in the event that the compressor 7 is not operating, and it serves additionally as a temperature control when the compressor is operating. The gaseous working medium, which is of a conventional type, is liquefied when it leaves condenser 5, but any gas residues are still liquefied in a small air cooled auxiliary condenser 8. Upon leaving the auxiliary condenser the completely liquefied coolant is conducted over an injector valve 9 into the evaporator portion 10 of the compressor 7 comprising a cooling cylinder 11 which has a hollow casing including evaporator passageways or channels arranged preferably in spiral form. In this cooling zone the untempered candy mass which is heated to at least 36° C. is cooled down again to the working temperature of between 26 and 31° C., depending upon the type of candy mass to be applied.

The conveyor screw 12 mounted in cooling cylinder 11 at the forward end of the apparatus moves the tempered candy mass 13 to the forming machine and provides at the same time a good heat exchange in the cooling cylinder 11. When the candy mass leaves the cooling cylinder 11 its temperature is sensed by a built-in probe 30 and by a conventional regulating member 14 in the form of a temperature gauge including a switch (not shown) which controls an electric an electric current line passing from the compressor to a flow control valve 22.

In order to avoid disturbances in the automatic working process of the device it is preferable to design the compressor 7 for an output which is about 5–10% larger than is required for the actual cooling of the mass. The lowering of the temperature of the candy mass below the temperature set at the control member 14 is prevented by means of a by-pass line 20 which extends between the gas-line 21 leading from the compressor 7 to the condenser 5 and the liquid line 23 of the compressor leading to the evaporator 10. A magnetic valve 22 is located in this by-pass line 20 between the condenser line 21 and the evaporator line 23. The by-pass line 20 is connected between the injection valve 9 and the evaporator casing 10, and the valve 22 is controlled by the switching thermometer 14 which measures the temperature at the outlet of the conveyor screw 12. With further reference to the provision of a water jacket around the cooling cylinder 11 indicated in the parent application, this cooling jacket is disposed around the cooling cylinder 11 of the conveyor screw 12 and is connected through a flow control valve 25 to the water jacket 1 of the storage container 2.

When during operation the temperature set at the thermometer 14 goes below the predetermined temperature due to the cooling capacity of compresseor 7 designed to furnish excess cooling, the control valve 22 opens. When this occurs, heating gas flows into the liquid line 23 so that the liquefied work medium of the compressor is partially evaporated. The cooling output decreases accordingly so that the temperature of the chocolate mass in the screw conveyor 12 increases. In this manner the temperature of the chocolate mass at the outlet of the conveyor screw is varied by opening and closing control valve 22 so that the desired temperature range is obtained. In this temperature control arrangement the water jacket 24 serves as insulating jacket and when the compressor 7 is not operating this jacket serves to heat the conveyor screw 12. Valve 25 controls the circulation of water between the water jackets 1 and 24.

It is to be understood that the invention is not limited to the specific embodiment herein illustrated and described, but may be used in other ways without departure from its spirit as defined by the following claims.

What is claimed is:

1. Apparatus for maintaining controlled temperatures in a chocolate candy mass comprising in combination
conveyor means for advancing the candy mass along a path and including a heating cylinder and a cooling cylinder serially arranged along said path,
condenser means disposed in heat exchange relationship with said heating cylinder,
evaporator means disposed in heat exchange relationship with said cooling cylinder,
compressor means connected to said condenser means and said evaporator means, expansion means between said compressor means and said evaporator means,
first conduit means for connecting said compressor to said condenser means,
second conduit means for connecting said condenser means to said evaporator means,
said compressor circulating a working medium successively through said condenser means and said evaporator means,
a by-pass line for connecting said first conduit means to said second conduit means,
flow control means mounted in said by-pass line,
means for sensing the temperature of the candy mass at the discharge end of said conveyor means,
and temperature control means connected to said flow control means for actuating said last named means to regulate the flow of working medium from said first conduit means into said second conduit means.

2. Apparatus according to claim 1 wherein said by-pass line extends from said first conduit means adjacent said compressor to said second conduit adjacent said evaporator.

3. Apparatus according to claim 1 wherein said expansion means includes a flow control valve in said second conduit means upstream of said by-pass line.

4. Apparatus for maintaining controlled temperatures in a chocolate candy mass comprising in combination
conveyor means for advancing the candy mass along a path and including a heating cylinder and a cooling cylinder serially arranged along said path,
a conveyor screw rotatably mounted in said heating cylinder and in said cooling cylinder,
a storage container for the candy mass and communicating with said heating cylinder,
a first water jacket disposed in heat exchange relationship with said storage container and said heating cylinder,
a condenser coil disposed in said first water jacket adjacent said heating cylinder,
heating means in said first water jacket and adapted to supply heat to the water in said first water jacket independently of said condenser coil,
said cooling cylinder having a hollow evaporator casing,
compressor means connected to said condenser coil and to said evaporator casing, expansion means between said compressor means and said evaporator means,
first conduit means for connecting said compressor to said condenser coil,
second conduit means for connecting said condenser coil to said evaporator casing,
said compressor circulating a working medium successively through said condenser coil and said evaporator casing,
a by-pass line for connecting said first conduit means to said second conduit means,
a flow control valve connected in said by-pass line,
means for sensing the temperature of the candy mass at the discharge end of said conveyor means,
a temperature gage connected to said temperature sensing means and to said flow control valve for actuating said valve to regulate the flow of working medium between said first and second conduit means,
a second water jacket disposed in heat exchange relationship with said evaporator casing,
third conduit means for connecting said first water jacket to said second water jacket,
valve means disposed in said third conduit means for controlling the circulation of water between said first and said second water jacket.

5. Apparatus according to claim 4 wherein said third conduit means include a first pipe extending from said first water jacket adjacent said storage container to said second water jacket adjacent its top portion,
and a second pipe extending from said first water jacket adjacent said condenser coil to said second water jacket adjacent its bottom portion.

References Cited by the Examiner
UNITED STATES PATENTS

| | | | |
|---|---|---|---|
| 2,344,215 | 3/44 | Soling et al. | 62—355 X |
| 2,808,235 | 11/57 | Sollich | 165—26 |

ROBERT A. O'LEARY, *Primary Examiner.*

CHARLES SUKALO, *Examiner.*